Dec. 13, 1949 — R. J. BOTTONI — 2,491,157
CABLE HOLDER FOR JUNCTION BOXES
Filed Aug. 10, 1945 — 2 Sheets-Sheet 1
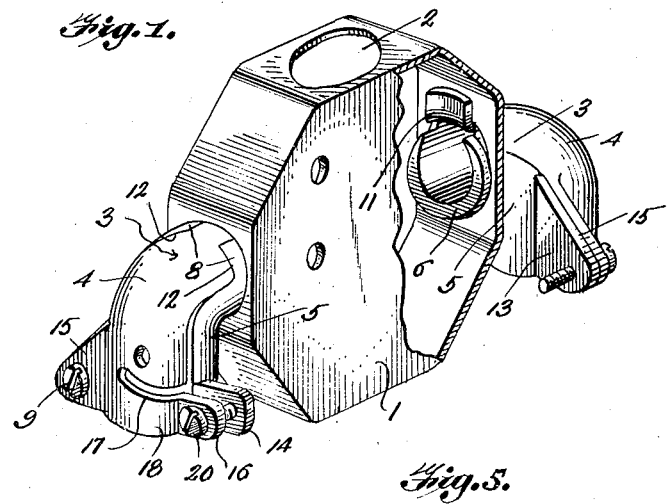
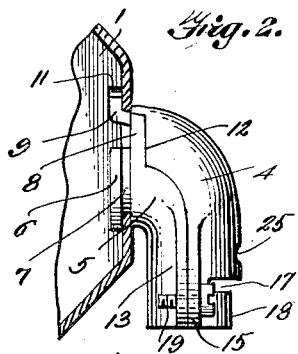
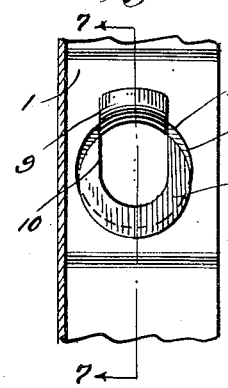
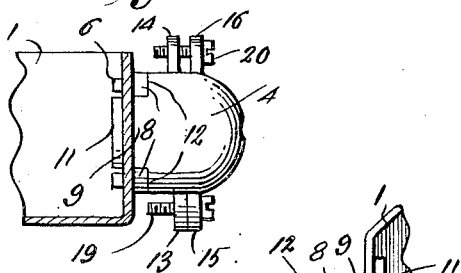
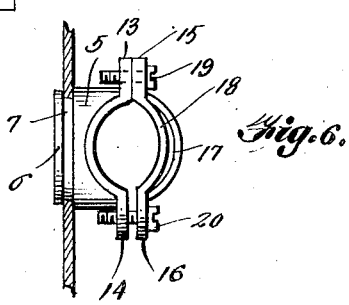
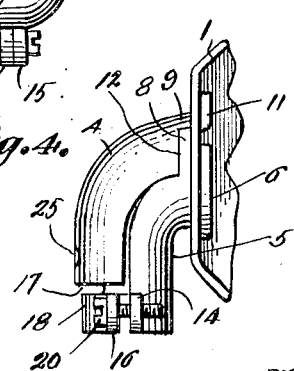
INVENTOR
ROBERT J. BOTTONI
ATTORNEY Dec. 13, 1949    R. J. BOTTONI    2,491,157
CABLE HOLDER FOR JUNCTION BOXES
Filed Aug. 10, 1945    2 Sheets-Sheet 2
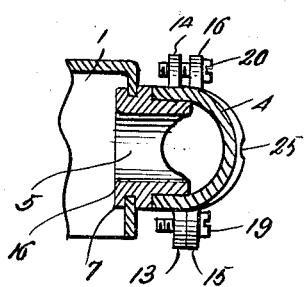
Fig. 7.a
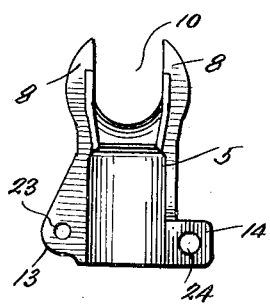
Fig. 9.
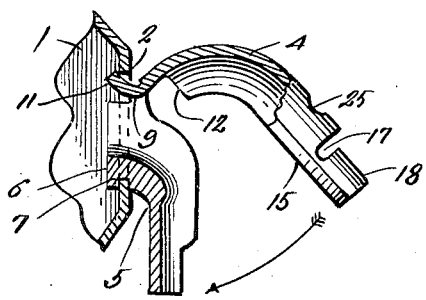
Fig. 8.
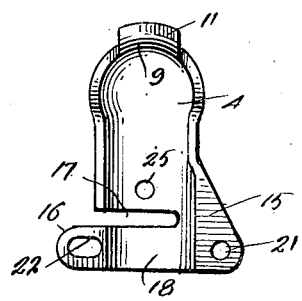
Fig. 10.
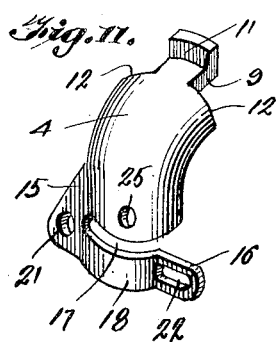
Fig. 11.
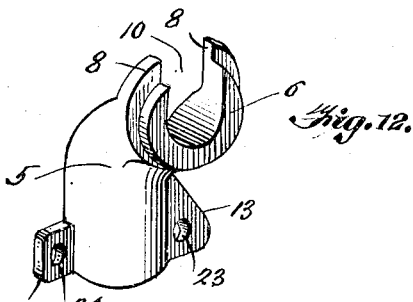
Fig. 12.
INVENTOR
ROBERT J. BOTTONI
BY Ross J. Woodward
ATTORNEY Patented Dec. 13, 1949

2,491,157

UNITED STATES PATENT OFFICE 2,491,157

CABLE HOLDER FOR JUNCTION BOXES

Robert J. Bottoni, West Orange, N. J., assignor of one-half to Victor J. Haroldson, New York, N. Y.

Application August 10, 1945, Serial No. 610,127

2 Claims. (Cl. 285—6.5)

This invention relates to junction boxes and more particularly to a cable holder adapted to be applied to a junction box of conventional formation and serves as means for holding a cable in engagement with the junction box and directing the cable into the box.

One object of the invention is to provide a device which may be easily applied to a junction box with one end mounted through an opening in the box and its other end portion in gripping engagement with a cable which passes through the holder, the cable being thus firmly gripped and strain upon its connection with wires of other cables in the box eliminated. It will thus be seen that wires connected to each other within the junction box can not be separated by strain and danger of fire from crossed wires will be prevented.

Another object of the invention is to provide an elbow, consisting of companion sections which are held in engagement with the junction box and each other by inner ends of the sections being passed through an opening in a wall of the box, the inner ends of the sections having means for engaging portions of the wall about the opening and preventing outward movement of the elbow.

Another object of the invention is to provide an elbow or wire holder which has outer ends of its companion sections connected with each other by screws or equivalent fasteners which draw the sections towards each other into gripping engagement with a cable passing through the elbow.

Another object of the invention is to so form the sections of the elbow that when the screws are tightened a rocking movement takes place and inner ends of the sections will be caused to be securely held against outward movement through the opening in the wall of the junction box.

Another object of the invention is to provide a cable holder or elbow which is of simple construction and may be manufactured at low cost.

The invention is illustrated in the accompanying drawings, wherein:

Figure 1 is a perspective view of a junction box with cable holders of the improved construction applied thereto.

Figure 2 is a view showing a portion of the junction box in section and a cable holder in side elevation.

Figure 3 is a view taken along the line 3—3 of Figure 2.

Figure 4 is a view looking at the opposite side of the cable holder from that of Figure 2.

Figure 5 is a view showing the junction box in section and looking at the inner end of the cable holder.

Figure 6 is a view looking at the outer end of the cable holder.

Figure 7 is a sectional view taken longitudinally through the cable holder along line 7—7 of Figure 5.

Figure 7a is a sectional view taken along line 7a—7a of Figure 7.

Figure 8 is a view similar to Figure 7, showing the manner in which the sections of the holder are fitted into the opening of the junction box.

Figure 9 is a view looking at the inner face of one section of the cable holdeer.

Figure 10 is a view looking at the inner face of the other section of the cable holder.

Figure 11 is a perspective view looking at the outer face of the section shown in Figure 10.

Figure 12 is a perspective view looking at the outer face of the section shown in Figure 9.

This improved cable holder is used as means for guiding a cable into a junction box of conventional formation and holding the cable against outward slipping which would apply strain to wires of the cable and tend to break wires which have been soldered to each other within the box and cause danger of fire by wires becoming crossed and a short circuit caused within the box.

The junction box, which is indicated in general by the numeral 1, is of conventional formation and has its walls formed with the usual knockout portions for forming openings 2 through which cables are passed into the junction box. The cables pass through the improved cable holders, which guide the cables into the box, and in addition have gripping engagement with the cables to prevent the cables from slipping outwardly through the holders and causing strain upon wires of the cables. Therefore, the cables will be held in the junction box and short circuits cannot occur due to wires being broken by strain.

Two of the cable holders have been shown in Figure 1, but it will be understood that one will be used for each cable which is to be inserted into the box. Each of the cable holders 3 is in the form of an elbow and has companion sections 4 and 5, which are curved longitudinally and have their side wall portions in edge to edge engagement with each other. The inner end of the section 5 is formed with an anchoring portion 6 in which a groove 7 is formed to receive a portion of the wall of the junction box and at opposite sides of the head or anchoring portion 6 are formed arms 8, which are disposed externally of the box when this section is applied to the box. The size of the anchoring portion is such that it may be easily passed through an opening 2 of the box and a portion of the wall of the box bordering the opening engaged in the groove 7.

After the section 5 has been applied to the junction box the section 4 is applied. This section has its inner end formed with a tongue 9 of such width that it fits snugly within the slot or opening 10 between the arms 8 and the free end portion of the tongue is formed with a flange or bill 11 which extends its full width and engages the inner surface of the wall of the junction box as the section 4 is swung towards the section 5. Referring to Figure 8, it will be seen that when the section 4 is applied the tongue is passed inwardly through the opening 2 and the section 4 then tilted towards section 5, and during this movement the shoulders 12 of section 4 will move into abutting engagement with the outer edge faces of the arms 8 and apply inward pressure to the same and hold the section against outward movement.

At opposite sides of its outer end the section 5 is formed with ears 13 and 14 and the section 4 also has its outer end portion formed with ears 15 and 16, a slot 17 being formed across the section 4 in spaced relation to its outer end to form a tongue or jaw 18 having the ear 16 at its outer free end. Screws 19 and 20 are passed through unthreaded openings 21 and 22 formed in the ears 15 and 16 and engaged in threaded openings 23 and 24 formed in the ears 13 and 14 and when these screws are tightened the two sections will be forced towards each other and the inner end of the elbow or cable holder prevented from slipping out of the opening 2 through which it passes. Since the ear 16 forms a terminal for the tongue 18 and its opening 22 is elongated longitudinally of the ear the tongue 18 may be flexed inwardly as the screw 20 is tightened and the tongue caused to have gripping engagement with a cable passed through the elbow or holder. Therefore, the cable can not shift outwardly through the elbow and wires which have been soldered together within the junction box will not be subjected to strains which would be liable to break them. A sight opening 25 is formed through section 4 above the slot 17 in order that an inspector may see the portion of the cable within the holder and see if the wire is properly insulated. When it is desired to remove the holder from the junction box it is merely necessary to remove the screws 19 and 20 and the section 4 may then be swung away from section 5 and its tongue 9 tilted out of the opening 2 of the junction box, the section 5 being then shifted to move it out of engagement with the wall of the box and through the opening thereof. Since the holder or elbow is circular in cross section it may be turned in the opening 2 and caused to project from the wall of the box in any direction desired.

There has therefore been provided a cable holder formed of two sections adapted to be fitted through an opening in a junction box from the outside and of such formation that when the sections are passed through the opening and disposed in operative engagement with each other the cable holder will be firmly held to the junction box without it being necessary to reach into the junction box and apply a nut to the inner end of the holder.

Having thus described the invention, what is claimed is:

1. In combination with a junction box having a wall formed with an opening, a cable holder comprising longitudinally extending inner and outer sections, said inner section having a groove extending transversely about its inner end and into which a portion of the wall of the box fits to anchor the inner section through the opening, there being arms at the inner end of the inner section bearing against the outer surface of the wall of the box along opposite sides of the opening, said outer section having edge to edge engagement with the inner section and at its inner end being formed with a tongue fitting snugly between arms of the inner section and passing inwardly through the opening in the junction box and terminating in a flange extending its full width and bearing against the inner surface of the wall of the box, said outer section having shoulders projecting from opposite sides of the tongue and bearing against outer surfaces of the arms of the inner section, ears projecting from opposite sides of the outer end of the inner section and formed with threaded openings, ears projecting from opposite sides of the outer end of the outer section, said outer section having its outer end portion formed with a transverse slot forming a yieldable transversely extending tongue of the outer end portion of the said outer section, said yieldable tongue having one of the ears of the said outer section at its free end, and screws passed through openings in the ears of the outer section and threaded through the openings of the ears of the inner section to hold the sections firmly in edge to edge engagement with each other and flex the yieldable tongue inwardly into position for gripping engagement with a cable passed through the cable holder.

2. A tubular cable holder for a junction box comprising inner and outer longitudinally extending sections curved longitudinally and arcuate transversely and having opposite side edge portions disposed in edge to edge engagement with each other, said inner section having a groove extending transversely across its inner end for receiving a portion of the wall of a junction box and arms at opposite sides of its inner end for bearing against the outer surface of the wall of the box about at opposite sides of an opening through which the said holder passes, said outer section having a tongue for passing inwardly through the opening of the box and terminating in a flange extending the full width of the tongue in position for engaging the inner surface of the wall of the box, the outer section having shoulders at its inner end for engaging outer surfaces of the arms of the inner section, side edges of the outer section having their inner end portions engaging side edges of the inner section and their outer end portions spaced from edges of the inner section whereby the outer section may have rocking movement relative to the inner section, ears at opposite sides of the outer end of the inner section, an ear at one side of the outer end of the outer section, said outer section being formed across its outer end portion with a slot forming a yieldable transverse tongue terminating in an ear at its free end, and fasteners passed through the ears of said sections and when tightened serving to hold the sections in close contacting engagement with each other and flex the tongue extending across the outer end of the outer section inwardly to a position for gripping a cable passed through the cable holder.

ROBERT J. BOTTONI.

REFERENCES CITED

The following references are of record in the file of this patent:

UNITED STATES PATENTS

| Number | Name | Date |
| --- | --- | --- |
| 1,475,524 | Thomas | Nov. 27, 1923 |
| 1,885,228 | Buchanan | Nov. 1, 1932 |